United States Patent Office 3,356,666
Patented Dec. 5, 1967

3,356,666
PROCESS OF POLYMERIZING BUTENE-1
Milton K. Rosen, Rockaway Township, Morris County, and Charles D. Mason, Florham Park, N.J., assignors to Allied Chemical Corporation, New York, N.Y., a corporation of New York
No Drawing. Filed Aug. 27, 1963, Ser. No. 304,955
7 Claims. (Cl. 260—93.7)

This invention relates to the polymerization of olefins, and more particularly to processes for the polymerization of butene-1 to produce polybutene of high isotacticity.

The polymerization of alpha olefins to produce polyolefins by either batch or continuous techniques, in the presence of an inert liquid organic solvent such as the aliphatic hydrocarbons, e.g., hexane, heptane or isooctane, in the presence of a Ziegler type catalyst and aluminum alkyl co-catalyst has been disclosed. Polymerization of alpha olefins containing three or more carbon atoms results in polymers containing atactic material. The amount of atactic material formed depends on the polymerization conditions and the monomer subjected to polymerization. In general, the greater the proportion of atactic material, the lower the hardness and the softening point of the polymer. For many industrial uses polymers of high isotacticity are required.

The isotactic material is the crystalline material insoluble in diethyl ether and hydrocarbon solvents such as n-heptane. The atactic material is that soluble in such solvents.

It is customary practice in the production of alpha olefin polymers to effect relatively complete separation of the isotactic and atactic material produced in the polymerization by extraction of the polymer with a suitable organic solvent such as n-heptane, which extraction of the atactic resin occurs during the formation of the isotactic resin. Polypropylene of high isotacticity is produced, for example, by conducting the polymerization of the propylene in n-heptane. The randomly formed material (atactic) dissolves in the heptane while the stereoregular polymer does not. At the end of the polymerization the isotactic polypropylene is filtered free of the heptane containing the undesirable atactic resin. Polypropylenes of high isotacticities thus result.

The polymerization of butene-1 under similar conditions takes place at a considerably reduced rate. This is believed to be due to the fact that polybutene which has more of a hydrocarbon structure than polypropylene is swollen by the reaction media as it is formed. The swollen resin entraps the catalyst particles and hence a reasonable rate of polymerization and conversion to polymer does not take place. Moreover the catalyst consumption in such procedures is inordinately high.

It is a principal object of the present invention to provide a process of polymerizing butene-1 resulting in the production of polybutene-1 of high isotacticity, in improved yields, at relatively high polymerization rates and in a readily recoverable form substantially uncontaminated with catalyst.

It is another object of this invention to provide such process in which the isotacticity and molecular weight of the polymer can be readily controlled during the course of the polymerization to produce a polymer of desired isotacticity and molecular weight.

Other objects and advantages of this invention will be apparent from the following detailed description thereof.

In accordance with this invention polybutene-1 is polymerized employing a Ziegler type catalyst system including an aluminum alkyl co-catalyst, in a solvent medium consisting of branched chain hydrocarbons of which from 85% to 95% is isooctane and the rest chiefly isononane and isoheptane at a temperature 50° C. to 90° C. and under superatomspheric pressure conditions of from 50 p.s.i.g. to 175 p.s.i.g. When the polymerization has been completed and while the polymerization mixture is at a temperature of 50° to 90° C., water is added to the polymerization mixture to quench the catalyst; the amount of water added is sufficient to destroy the activity of the catalyst but insufficient to wet the polybutene and cause an appreciable amount thereof to precipitate from the solution thereof in the branched chain hydrocarbon. This solution is separated from the catalyst precipitate, for example by filtration. Upon addition of alcohol to the solution thus separated from the catalyst and cooling the resultant solution to a temperature of from 20° to 70° C., desirably ambient temperature, the polybutene-1 resin precipitates from the solution. Alternatively, the solution separated from the catalyst and without the addition of alcohol thereto can be cooled to a temperature of 15° C. or lower, say down to about −10° C., to effect precipitation of polybutene-1 resin. The resultant resin is of relatively high isotacticity; polybutene-1 having an isotacticity above 90% has been produced in high yield, at high polymerization rates and substantially uncontaminated with catalyst.

In this specification percentages and parts are given on a weight basis.

The butene-1 used should be relatively free of catalyst poisons such as water, oxygen, carbon monoxide, etc. The butene-1 can be given a preliminary purification treatment with a suitable adsorbent such as silica gel. It can be purified by treatment with a solution of aluminum alkyl before introduction into the polyymerization zone.

Polymerization can be effected either batchwise or continuously. Batchwise polymerization can be carried out, for example, by mixing the butene-1, solvent, catalyst and co-catalyst in the proportions of from 500 to 4000, preferably 1000 to 2000, parts of solvent per part of catalyst, and from 0.6 to 5, preferably from 1 to 1 or 2, parts of co-catalyst per part of catalyst, and heating the mixture to a temperature of from 50° to 90° C. under a pressure of from 50 p.s.i.g. to 175 p.s.i.g. until the polymerization has been effected.

Continuous polymerization can be carried out by introducing continuously the purified butene-1, solvent, catalyst and co-catalyst in the disclosed proportions (500 to 4000, preferably 1000 to 2000, parts of solvent per part of catalyst and from 0.6 to 5, preferably from 1 to 1 or 2, parts of co-catalyst per part of catalyst) to the polymerization zone maintained at a temperature within the range of from 50° to 90° C. under a pressure of 50 p.s.i.g. to 175 p.s.i.g. (the pressure being maintained by supplying the butene-1 and solvent under the necessary pressure conditions so to do) and continuously withdrawing the polymerized reaction mixture from the polymerization zone. Still another procedure, continuous in character during each run, is to maintain a body of solvent containing catalyst and co-catalyst in the disclosed proportions at polymerization temperatures in the polymerization zone and continuously supplying thereto, at a rate and under the necessary pressure to maintain the desired pressure conditions during the polymerization, butene-1 until enough butene-1 has been introduced to practically exhaust the catalyst, whereupon the polymerized reaction mixture is withdrawn from the polymerization zone and a new supply of solvent containing catalyst and co-catalyst introduced thereinto.

Hydrogen can be introduced into the mixture subjected to polymerization to control the molecular weight of the polymer. The amount of hydrogen thus introduced depends on the desired molecular weight of the polybutene-1.

In each of the above disclosed polymerization techniques, when the polymerization has reached completion and while the polymerization mixture is at a temperature within the range of from 50° to 90° C., water is added to quench or destroy the catalyst. The amount of water thus added can be from 5 to 25 parts per part of catalyst. The addition of this amount of water does not result in wetting the polybutene in solution in the solvent and hence the polybutene remains in solution while the catalyst precipitates. The solution of polymer is separated from the catalyst precipitate in any desired manner, for example by filtration or centrifugal separation.

Precipitation of the polybutene from the solvent solution can be effected by refrigeration of the solution to 15° C. or lower, say down to −10° C., or by addition of alcohol and cooling the resultant solution.

An aliphatic alcohol having from 1 to 4 carbon atoms can be added to the solution in amount of from 1 to 2 volumes of alcohol per volume of polymer solution. Upon cooling the resultant mixture to a temperature of from 20° to 70° C., the polymer precipitates. The greater the number of carbon atoms in the alcohol added to the solvent containing the polybutene-1 in solution, the greater the isotacticity of the resuling polymer when employing not exceeding two volumes of alcohol per volume of solution containing the polymer to which the alcohol is added. Thus when utilizing butanol as the alcohol added to the polybutene-1 solution to effect precipitation of the polybutene-1 a polymer is obtained having an appreciably higher isotacticity than when utilizing methanol, ethanol or isopropanol, utilizing like amounts up to 2 volumes of butanol per volume of polybutene-1 solution. With the lower alcohols the same high isotacticity can be obtained but by using smaller volumes of alcohol, with the objections inherent in the handling of such smaller volumes; evidently the smaller volume of lower alcohol and branched chain hydrocarbon solvent retains the atactic material in solution while the isotactic polymer precipitates. Even without the addition of alcohol to the solution of polybutene separated from the catalyst, a polybutene of high isotacticity is obtained by refrigeration of the solution to precipitate the resin. This is indeed surprising and unexpected.

In polymerization of alpha olefins, it is known that a catalyst system consisting, for example, of titanium trichloride with an aluminum alkyl, must be insoluble in the reaction media in order to obtain stereoregular polymerization, i.e., polymers of high isotacticity (cf. 1s. Natta, Chimica e Industria 42, No. 11, 1207–1225, November 1960). While the catalyst system is an important factor in the production of polymers of high isotacticity, it is not the only factor. In the polymerization of polypropylene, solvent systems in which polypropylene is soluble have been found to produce chiefly amorphous polymers (M. Sittig, Petroleum Refiner, vol. 40, No. 3, p. 132, 1961). It is, therefore, indeed surprising that the use of the solvent system of the present invention consisting essentially of branched chain hydrocarbons of which from 85% to 95% is isooctane and the remainder chiefly isonane and isoheptane, in which system the polybutene dissolves as formed producing a homogeneous solution of polymer in the solvent, results in polybutene of high isotacticity, and the solution of this relatively high isotactic resin in the solvent is so complete that upon addition of water to quench the catalyst, the resultant solution can be passed directly through a filter to remove the catalyst residue and obtain a solution of resin substantially free of catalyst particles from which a polybutene resin of high isotacticity can readily be recovered either by refrigeration of the solution or by addition of alcohol thereto as herein disclosed followed by cooling to a temperature of from 20° to 70° C. As noted herein the isotacticity of the resin can be controlled by the alcohol employed; the greater the number of carbon atoms in the alcohol the greater the isotacticity of the resultant polymer when employing not more than two volumes of alcohol per volume of solution containing the polybutene to which the alcohol is added.

Any of the known Ziegler catalysts along with an aluminum alkyl co-catalyst can be used; for example, catalysts obtained by reaction between compounds of metals of group IV–B (titanium, zirconium, hafnium or thorium), V–B (vanadium, columbium or tantalum), VI–B (chromium, molybdenum, tungsten or uranium with aluminum alkyls, e.g., diethyl aluminum chloride, triisobutyl-aluminum, trimethyl-aluminum, triethyl-aluminum, etc. As such catalyst systems are well known, further disclosure thereof would serve no useful purpose.

The solvent used desirably is a commercially available fraction of branched chain hydrocarbons containing from 85% to 95% of isooctane and from 5% to 15% of a mixture of isononane and isoheptane. One example of such commercial fraction is Isopar C (Standard Oil of New Jersey) which consists of 91% isooctane, 3+ percent isononane and 4+ percent isoheptane. Instead of the commercially available fractions the solvent used can be prepared by mixing isooctane with isononane and isoheptane to produce the solvent containing from 85% to 95% isooctane and the rest a mixture of isonane and isoheptane. The relative proportions of isononane and isoheptane constituting from 5% to 15% of the solvent are not critical; desirably approximately equal amounts of these components are used.

The following examples are illustrative of preferred embodiments of the invention. It will be understood that the invention is not limited to these examples.

In all of the examples the solvent used was Isopar C, the composition of which is given above. The catalyst used was titanium trichloride, the co-catalyst diethyl aluminum chloride.

EXAMPLE 1

In this example, one part of $TiCl_3$ and 2 parts of diethyl aluminum chloride were added to 2250 ml. of solvent. The temperature was maintained at 70° C. and the pressure at 120 p.s.i.g. by introducing butene-1 at a rate and under the pressure conditions to maintain this pressure. This run lasted for four hours during which time 352 parts of butene-1 was introduced.

At the conclusion of the four hours, 20 parts of water was added while the polymer mixture was at 70° C. to kill the catalyst. A solution of polybutene-1 in the solvent was obtained which was filtered to effect its separation from the catalyst. To the clear filtrate was added 1800 parts of methanol and the solution cooled to 30° C. The polybutene-1 precipitated. It had a molecular weight of 1,000,000 and isotacticity of 79%. In this run 296 parts of polymer was produced per part of catalyst and the rate of polymerization was 74 parts per hour per part of catalyst.

In Table I which follows is given for comparative purposes data on the molecular weight, percent isotacticity, the amount of polymer produced per unit weight of catalyst (P/C) and the amount of polymer produced per hour per unit weight of catalyst (P/hr./wc). This table also indicates the solvent media in which the polymerization is conducted. The polymerization conditions, except for the solvent media used, were substantially the same, except that in the comparative runs the separation of the polymer from the catalyst did not occur as in Example 1 because the solvents used in the comparative runs did not provide a solvent system from which the polymer could be precipitated upon addition of water and cooling. In the comparative runs the polymerization reaction mixture was added to an equal volume of methanol, and the polymer containing entrapped particles of catalyst separated from the precipitated catalyst.

TABLE I

|  | Solvent | Molecular Weight | Isotacticity, Percent | P/C | P/hr./wc |
|---|---|---|---|---|---|
| Example 1 | Isopar C | 1,000,000 | 79 | 296 | 74 |
| Comparative Runs: |  |  |  |  |  |
| A | n-Pentane |  |  | 28 | 7 |
| B | Isopentane | 485,000 | 74 | 37 | 8.2 |
| C | n-Hexane |  |  | 17 | 4.3 |
| D | Cyclohexane | 400,000 | 84 | 43 | 10.7 |
| E | n-Octane | 493,000 | 70 | 65 | 16 |
| F | n-Nonane |  |  | 88 | 22 |

Molecular weight and isotacticity determinations were not made on runs in which the polymer to catalyst ratio was less than 30 because runs giving such low polymer to catalyst ratio obviously are not attractive from an economic standpoint.

EXAMPLE 2

To 20,000 ml. of Isopar C was added 10 grams of titanium trichloride and 10 grams of diethyl aluminum chloride. The suspension was heated to 65° C. and stirred. Butene-1 was introduced at a rate of 10 grams per minute along with hydrogen introduced at a rate of 0.13 gram per minute under pressures of 130 p.s.i.g. until the pressure in the reactor was brought to 120 p.s.i.g. The contents of the reactor were maintained at 70° C. The run lasted six hours. The pressure was maintained at 120 p.s.i.g. during this six hours by the introduction of the butene-1. The total amount of butene-1 thus introduced at the end of six hours was 5700 grams. The total amount of hydrogen introduced during this period was 4.1 grams. At the end of the six hours 200 ml. of water was added to destroy the catalyst. The mixture was stirred for one-half hour, the unreacted butene-1 vented off and the polymer solution at a temperature of 70° C. filtered through a cartridge type filter of 3–5 micron pore size under pressure of 50 p.s.i.g. of nitrogen on the polymer solution.

A water-clear solution of polymer was thus obtained; it was introduced into 20 liters of methyl alcohol at a temperature of 23° C. while stirring. The polybutene separated as a white solid. After 15 minutes of stirring the mixture, the polybutene-1 was separated from the liquid by filtration and dried.

4858 grams of polybutene-1 was obtained having an average molecular weight of 126,000. A portion was extracted with boiling diethyl ether and found to be 91% insoluble. Thus the polybutene had an isotactic content of 91%.

A specimen of the methyl alcohol solvent mixture from which the polybutene had been separated was evaporated to dryness and was found to contain 23 grams of unprecipitated polybutene. The precipitated polybutene was found to have an ash content of 216 p.p.m. This demonstrates the surprising and unexpected property of the solvent containing from 85% to 95% isooctane and the rest a mixture of isononane and isoheptane to dissolve substantially completely the polybutene without entrapment of catalyst and thus enable the substantially complete separation of the polybutene from the catalyst with consequent production of a polybutene-1 having a low ash content.

EXAMPLES 3 TO 6, INCLUSIVE

Examples 3 to 6, inclusive, differ from Example 2 chiefly in the amount of the butene-1 and hydrogen in the solvent suspension of catalyst and co-catalyst subjected to polymerization. The feed rates used and the molecular weight and isotacticity of the resultant polybutene-1, isolated in the same manner as in Example 2, are given in Table II which follows:

TABLE II

| Example No. | Total Hydrogen Feed (g.) | Total Butene-1 Feed (g.) | Molecular Weight | P/hr./wc | Percent Isotacticity | P/C |
|---|---|---|---|---|---|---|
| 3 | 12.0 | 3,870 | 34,500 | 54 | 71 | 329 |
| 4 | 7.0 | 4,100 | 60,500 | 60 | 74 | 340 |
| 5 | 3.97 | 4,950 | 129,000 | 74 | 77 | 430 |
| 6 | 1.07 | 7,300 | 165,000 | 84 | 86 | 645 |

EXAMPLE 7

Part 1

In a one gallon stirred autoclave was placed one part of $TiCl_3$, 3 parts of diethyl aluminum chloride and 2000 ml. of a mixture of branched hydrocarbons consisting of 91% isooctane, 3+ percent isononanes and 4+ percent isoheptanes. The temperature of the suspension was maintained at 50° C. for 5 hours. During this time butene-1 was metered in at a rate and under a pressure of 60 p.s.i.g. The amount of butene was gradually increased over a period of four hours until a pressure of 120 p.s.i.g. was exerted. The reactor was maintained at this pressure for one hour. A total of 185 parts of butene-1 was introduced. At the end of this time 20 parts of water was added while the polymer solution was as at 50° C. After filtration of the catalyst residues, the clear solution of polybutene was allowed to sit at room temperature for 24 hours. A total of 68 parts solid polybutene precipitated. The material had a molecular weight of 460,000 with an isotacticity of 97%.

Part 2

Repetition of Part 1 of this example to produce the clear solution of polybutene followed by addition of an equal volume of methyl alcohol to the clear solution results in the production of 77 parts of polybutene having a molecular weight of 379,000 and an isotacticity of 83%.

Part 3

Repetition of Part 1 of this example to produce the clear solution of polybutene followed by addition of an equal volume of isopropyl alcohol to the clear solution results in the production of a polybutene resin having an average molecular weight of 410,000 and an isotacticity of 88%.

Molecular weights given herein were determined by solution-viscosity measurements (see Krigbaum, J. Phys. Chem. 65, 1984 (1961).

It will be noted that the present invention provides a process for polymerizing butene-1 to produce polybutene-1 of high isotacticity, in improved yields, at relatively high polymerization rates and in a readily recoverable form substantially uncontaminated with the catalyst. These results are attributable to the surprising and unexpected properties of the solvent containing from 85% to 95% of isooctane and the rest isononane and isoheptane in effecting the dissolution of the polymer upon addition of the water to effect precipitation of the catalyst at temperatures of from 50° to 90° C., thus enabling substantially complete separation of the precipitated catalyst from the polymer solution and the precipitation of polybutene-effecting the dissolution of the polymer upon addition of alcohol and cooling to a temperature of from 20° to 70° C. The use of alcohol, as herein disclosed, results in an increase in the isotactic content of the polymer. Evidently most of the atactic polymer formed remains in solution in the solvent-alcohol mixture while the polymer of high isotactic content separates as a solid.

By introducing hydrogen into the polymerization reaction mixture in controlled amount, a polymer of desired molecular weight and isotacticity can be formed. Also, by employing a selected aliphatic alcohol having from 1 to 4 carbon atoms in a volume not exceeding two volumes of alcohol per volume of solvent solution containing the polybutene-1 separated from the catalyst to effect the precipitation of the polybutene-1, the isotacticity of the polybutene-1 can be controlled, and this without requiring the use of a large excess of alcohol to effect the precipitation of the polybutene-1. As disclosed, the greater the number of carbon atoms of the alcohol used to effect the precipitation, the more atactic material remains in solution and the greater the isotacticity of the precipitated polybutene-1.

Since certain changes in carrying out the process for polymerizating butene-1 to produce polybutenes of high isotacticity can be made without departing from the scope of this invention, it is intended that all matter contained in this description be interpreted as illustrative and not in a limiting sense.

What is claimed is:

1. The process of polymerizing butene-1 to produce polybutene-1 which comprises mixing butene-1 with a solvent containing from 85% to 95% of isooctane and from 5% to 15% by weight of a mixture of isononane and isoheptane, a catalytic amount of a catalyst consisting essentially of a compound of a metal from the groups IV–B, V–B and VI–B of the Periodic Table and an aluminum alkyl, heating the resultant mixture to a temperature of from 50° to 90° C. and under superatmospheric pressure conditions of from 50 to 175 p.s.i.g. until the polymerization has been effected, thereafter adding water to the polymerization mixture to quench the catalyst, while maintaining the temperature within the range of from 50° to 90° C., thus precipitating the catalyst and producing a solution of the polybutene-1 in the solvent-water mixture, separating said solution of polybutene-1 from the catalyst, adding to said solution separated from the catalyst an aliphatic alcohol having from 1 to 4 carbon atoms and cooling the resultant mixture to effect precipitation of the bulk of the polybutene-1 and separating the polybutene-1 thus precipitated from the liquid.

2. The process as defined in claim 1, in which from 500 to 4000 parts of said solvent are mixed with each part of catalyst and from 0.6 to 5 parts of aluminum alkyl are mixed with each part of catalyst and the volume of alcohol added to the solution of polybutene-1 to effect the precipitation of the polybutene-1 does not exceed two volumes of alcohol per volume of polybutene-1 solution.

3. The process of polymerizing polybutene-1 as defined in claim 2, in which the amount of solvent used is from 1000 to 2000 parts of solvent per part of catalyst and the amount of aluminum alkyl is from 1 to 2 parts per part of catalyst.

4. The process as defined in claim 2, in which the aliphatic alcohol added to effect precipitation of the polybutene-1 is butanol in amount not exceeding two volumes of butanol per volume of solvent solution of polybutene-1.

5. The process as defined in claim 1, in which the solvent consists of about 91% isooctane, about 3% isononane and about 4% isoheptane.

6. The process as defined in claim 1, in which the solvent consists of about 91% is octane, about 3% isonane and about 4% isoheptane, the amount of water added to quench the catalyst is from 5 to 25 parts by weight of water per part of catalyst, and the aliphatic alcohol added to precipitate the polybutene-1 from the solution thereof is butanol and is added in amount not exceeding two volumes of butanol per volume of solvent solution of polybutene-1.

7. The process as defined in claim 1, in which the catalyst is titanium trichloride, the co-catalyst is diethyl aluminum chloride, and the aliphatic alcohol added to precipitate the polybutene-1 is methanol.

References Cited

UNITED STATES PATENTS 2,886,561    5/1959    Reynolds et al. _____ 260—93.7

JOSEPH L. SCHOFER, *Primary Examiner.*

L. EDELMAN, *Assistant Examiner.*